(12) United States Patent
Xu et al.

(10) Patent No.: US 8,791,038 B2
(45) Date of Patent: Jul. 29, 2014

(54) CATALYST REGENERATION PROCESS FOR IMPROVING CATALYST SELECTIVITY

(75) Inventors: Youhao Xu, Beijing (CN); Shouye Cui, Beijing (CN); Zhigang Zhang, Beijing (CN); Weimin Lu, Beijing (CN)

(73) Assignees: China Petroleum & Chemical Corporation, Beijing (CN); Research Institute of Petroleum Processing, Sinopec, Beijing (CN)

( * ) Notice: Subject to any disclaimer, the term of this patent is extended or adjusted under 35 U.S.C. 154(b) by 220 days.

(21) Appl. No.: 12/749,996

(22) Filed: Mar. 30, 2010

(65) Prior Publication Data

US 2010/0248942 A1 Sep. 30, 2010

(30) Foreign Application Priority Data

| Mar. 31, 2009 | (CN) | 2009 1 0131983 |
| Mar. 31, 2009 | (CN) | 2009 1 0131984 |
| Mar. 31, 2009 | (CN) | 2009 1 0131985 |
| Mar. 31, 2009 | (CN) | 2009 1 0131986 |

(51) Int. Cl.

| *B01J 38/04* | (2006.01) |
| *B01J 38/12* | (2006.01) |
| *B01J 38/30* | (2006.01) |
| *B01J 38/34* | (2006.01) |
| *B01J 38/20* | (2006.01) |
| *B01J 38/16* | (2006.01) |
| *B01J 38/06* | (2006.01) |
| *B01J 23/94* | (2006.01) |
| *B01J 29/90* | (2006.01) |

(52) U.S. Cl.
CPC ............... *B01J 38/30* (2013.01); *C01G 11/185* (2013.01); *B01J 38/06* (2013.01); *B01J 38/12* (2013.01); *B01J 23/94* (2013.01); *C01G 11/05* (2013.01); *B01J 29/90* (2013.01); *C01G 11/182* (2013.01); *B01J 38/16* (2013.01); *B01J 38/34* (2013.01)

USPC .................... 502/43; 502/20; 502/34; 502/38; 502/41; 502/49; 502/51; 502/55

(58) Field of Classification Search
CPC ......... C10G 9/00; C10G 11/182; B01J 29/90; B01J 23/90; B01J 38/02; B01J 38/04; B01J 38/12; B01J 38/30; B01J 8/26
USPC ............................... 502/20–56; 208/113–164
See application file for complete search history.

(56) References Cited

U.S. PATENT DOCUMENTS

| 3,563,911 A | 2/1971 | Pfeiffer et al. | |
| 4,388,218 A * | 6/1983 | Rowe .............................. | 502/43 |
| 4,600,499 A * | 7/1986 | Hettinger, Jr. ................. | 208/113 |
| 4,959,334 A * | 9/1990 | Mauleon et al. ................ | 502/43 |
| 5,077,251 A * | 12/1991 | Owen et al. ..................... | 502/42 |
| 2007/0249879 A1 | 10/2007 | Iaccino | |
| 2007/0276171 A9 | 11/2007 | Iaccino | |
| 2007/0293709 A1 | 12/2007 | Iaccino | |
| 2010/0248942 A1* | 9/2010 | Xu et al. ......................... | 502/41 |

FOREIGN PATENT DOCUMENTS

| CN | 1052688 A | 7/1991 |
| CN | 1221022 A | 6/1999 |
| CN | 101362959 A | 2/2009 |
| EP | 1815907 A2 | 8/2007 |
| EP | 2077310 A1 | 8/2009 |
| JP | H01293137 A | 11/1989 |
| JP | 2008080238 A | 4/2008 |
| RU | 2051885 C1 | 1/1996 |
| WO | WO03/000826 A2 | 1/2003 |

* cited by examiner

*Primary Examiner* — Jennifer A Smith
(74) *Attorney, Agent, or Firm* — Scully, Scott, Murphy & Presser, P.C.

(57) ABSTRACT

The object of the present invention is to provide a catalyst regeneration process which can improve catalyst selectivity. A first aspect of the invention is characterized in that a spent catalyst from a reactor is introduced into a first fluidized bed regenerator and contacted with an oxygen-containing gas stream and optional steam to carry out a coke combustion reaction, wherein the resultant mixture of the partially regenerated catalyst and flue gas is introduced into a second fluidized bed regenerator and contacted with steam and an optional oxygen-containing gas stream to carry out a further regeneration reaction, and then the regenerated catalyst is introduced into the reactor. A second aspect of the invention is characterized in that a spent catalyst from a reactor is introduced into a fluidized dense bed regenerator and contacted with an oxygen-containing gas stream and steam to carry out a coke combustion reaction, and then the regenerated catalyst is introduced into the reactor. The inventive processes result in a more uniform distribution of the regenerated catalyst activity; due to the exposure of the catalyst to a low temperature for a long time, a part of the heavy metals are buried by the matrix and the remaining are passivated. Thereby dry gas and coke yields decrease sharply when hydrocarbons are subjected to a catalytic cracking reaction on the regenerated catalyst.

19 Claims, 2 Drawing Sheets

CATALYST REGENERATION PROCESS FOR IMPROVING CATALYST SELECTIVITY

FIELD OF THE INVENTION

This invention relates to a catalyst regeneration process of a carbonaceous catalyst in a catalytic cracking process of hydrocarbon oils. More particularly, the invention relates to a catalyst regeneration process for improving selectivity of catalyst in a catalytic cracking process of inferior hydrocarbon oils, wherein the cracking reaction deposits a great deal of cokes and metals on the catalyst, and thereby the activity and selectivity of catalyst are decreased sharply. The catalyst having sharply reduced activity and selectivity must be regenerated by a high temperature oxidation, which can burn off most of the deposited coke and passivate the activity of the metals on the catalyst to restore the activity and selectivity of catalyst.

BACKGROUND OF THE INVENTION

Besides light hydrocarbons, some coke is produced and deposited on the catalyst during the catalytic cracking process of inferior hydrocarbon oils due to a condensation reaction, resulting in a decrease of the catalyst activity and selectivity. The properties of the deactivated catalyst can be restored by a high temperature oxidation to burn off the coke on the catalyst, and this process is called as catalyst regeneration. Generally, the catalyst with a carbonaceous hydrocarbon or coke deposited thereon is called as the spent catalyst, and the oxidatively regenerated catalyst is called as the regenerated catalyst. In the early catalyst regeneration method, the oxygen-containing gas was passed through a low velocity fluidized bed and a single stage regeneration method was employed. However, employing such a low gas velocity and gas-solid backmixing fluidized bed regenerator, results in a low gas-solid contact efficiency, a low regeneration speed, a large inventory, a low catalyst regeneration efficiency, an coke content on the regenerated catalyst of about 0.2% by weight, a low coke burning severity of about 100 kg/(h·T) (kg for kilograms of coke burned, h for hour, T for ton of catalyst inventory in the regenerator). With the wide use of zeolite catalyst in the fluid catalytic cracking unit (FCCU), especially USY type zeolite catalyst, the residue coke content on the regenerated catalyst and the regeneration process have a great influence on restoration of the catalyst activity and selectivity. Therefore, the regeneration technology development trend is to reduce the catalyst inventory and improve the catalyst regeneration efficiency. During the FCCU running, both the exposure of the catalyst to high temperature and steam (water vapor) and the deposition of the heavy metals contained in the feedstock on the catalyst surface cause a continuous decrease of the catalyst activity. In order to maintain the equilibrium catalyst activity, additional fresh catalyst (i.e., make-up catalyst) must be added into the reaction-regeneration system. At a constant supplement of the fresh catalyst, the lower the catalyst inventory in the reaction-regeneration system, the higher the catalyst makeup rate and the equilibrium catalyst activity.

U.S. Pat. No. 3,563,911 discloses a two stages catalyst regeneration process, wherein spent catalyst is sequentially introduced to the first dense bed and second dense bed, and contacted with oxygen-containing gas stream to remove coke on the catalyst by a combustion reaction. Resulted flue gases are combined together and carry the entrained catalyst into a dilute settling section. In the first fluidized dense bed the regeneration temperatures is more than 1050° F. (about 565.5° C.). In the second fluidized dense bed the gas superficial velocity is maintained in the range of 1.25 to 6 feet per second (about 0.381 to 1.83 meter per second), and the regeneration temperature is maintained in the range from 1125 to 1350° F. (about 607.2 to 732.2° C.). Compared with a single stage regeneration process, the catalyst inventory in the regenerator is decreased by about 40%, and the coke content is below 0.1 wt % when a low coke burning rate is employed in the regeneration process.

CN1052688A discloses a fluidized two stages oxidation regeneration process. Spent catalyst is introduced into a first dense bed, contacted with an oxygen-containing gas stream and subjected to a reaction of coke burning. In the first fluidized dense bed, the gas superficial velocity is maintained in the range from 0.8 to 2.5 meter per second, the catalyst average residence time is maintained in the range of 0.6 to 1.0 min, and the regeneration temperature is maintained in the range from 650 to 750° C. A major portion of the carbonaceous deposits are removed by oxidation in the first fluidized bed. Flue gas combined with the partially regenerated catalyst are upwardly introduced to a second fluidized bed via a distributor, and then contacted with an oxygen-containing gas stream to carry out a reaction of coke burning. In second fluidized dense bed the gas superficial velocity is maintained in the range from 1.2 to 3.0 meter per second, the catalyst average residence time is maintained in the range from 1.0 to 2.2 min, and the regeneration temperature is maintained in the range from 700 to 800° C. After being sufficiently regenerated, the regenerated catalyst and flue gas are separated, a part of the regenerated catalyst is reintroduced into the reactor, and the other is introduced into the first fluidized bed.

CN1221022A discloses a residue fluid catalytic cracking process employing an overlapping two-stage regeneration. The first stage regenerator is located on an upper position, in which the regeneration temperature is maintained in the range from 650 to 720° C. The second stage regenerator is located below the first stage regenerator, in which the regeneration temperature is maintained in the range from 650 to 780° C. The two stage regenerators are connected together by a low pressure drop distribution plate and need only one flue gas line and one double slide valve or butterfly valve. Coke contents on the regenerated catalyst are in the range from 0.01 to 0.1% by weight.

Using the high activity zeolite catalyst, the superficial gas velocity in the regenerator is increased to above 0.6 m/s, the coke burning severity is increased to above 100 kg/(h·T), the regeneration temperature is maintained at about 700° C., and the catalyst residence time is reduced to below 4 min. According to the development of regeneration technology, the development direction always focuses on controlling the coke contents on the catalyst to below 0.1% by weight, preferable below 0.05% by weight, and controlling the specific coke burning severity to above 100 kg/(h·T) under a mild deactivating environment and attrition condition, and thereby the activity of the regenerated catalyst can be restored to the highest degree and the maximum conversion of hydrocarbon oils can be obtained.

CN101362959A discloses a catalytic conversion process for propylene and high octane gasoline products. Difficultly cracking oils are contacted with hot regenerated catalyst and subjected to a catalytic cracking reaction under conditions including a reaction temperature between 600° C. and 750° C., a WHSV between $100\, h^{-1}$ and $800\, h^{-1}$, a reaction pressure between 0.10 MPa and 1.00 MPa, a catalyst/feedstock oils ratio (C/O) between 30 and 150 by weight and a steam/difficultly cracking oil ratio between 0.05 and 1.0 by weight. The reacted effluents are mixed together with easily cracking oils and subjected to a catalytic cracking reaction under conditions including a reaction temperature between 450° C. and 620° C., a WHSV between 0.1 $h^{-1}$ and 100 $h^{-1}$, a reaction pressure between 0.10 MPa and 1.0 MPa, a catalyst/feedstock oil ratio (C/O) between 1.0 and 30 by weight and a steam/difficultly cracking oil ratio between 0.05 and 1.00 by weight. The spent catalyst and product vapors are separated by a cyclone separator. The spent catalyst is then charged into a stripping section and stripped. The stripped spent catalyst is regenerated by burning off the coke and reintroduced into the reactor. The product vapors are separated to obtain desired products comprising propylene, high octane gasoline and recracked oils. Said recracked oils comprise a fraction of distillation range 180 to 260° C. and heavy aromatics extracted oils. The invention greatly improves propylene yield and selectivity, greatly improves gasoline yield and octane number, and decreases the amplitude of dry gas yield by above 80% by weight. Based on a reaction spatio-temporal restraint theory, alkyl-structure groups and aryl-structure groups of the feedstock are separated by a reaction-separation technology. Saturated hydrocarbon in alkyl-structure groups and light aromatics are converted to liquid products by a mild catalytic cracking process. For aryl-structure groups, a part of asphaltenes are adsorbed by the external surface of the catalyst, and polycyclic aromatic hydrocarbons and resins are retained in the upgraded fraction. Thereby an idea of selectively cracking of alkane and alkyl-structure groups is implemented. The fractions which contain more polycyclic aromatic hydrocarbons and resins can be saturated by hydrogen in a hydrogenation unit or extracted in a heavy aromatic extraction unit. The hydrogenated saturated fractions or extracted oils are good quality FCC feedstock which can improve the product selectivity in the FCC and utilize petroleum oil resources efficiently. In order to easily control reaction parameters, it is preferred that the distributions of the catalyst activity and other properties are kept uniform in this process.

SUMMARY OF THE INVENTION

An object of the present invention is to provide a catalyst regeneration process which can improve the catalyst selectivity. The inventor has found that, in order to obtain good selectivity of desired products, it is disadvantageous if the catalyst activity is too high. Especially, fresh catalyst per se has a higher catalyst activity, which does not necessarily facilitate to improve the desired product selectivity. However, for obtaining good selectivity of the desired products, it is advantageous to reduce the fresh catalyst activity to an equilibrium catalyst activity as soon as possible. Moreover, a great deal of metals will deposit on the catalyst when feedstock oils are too heavy, and the catalyst selectivity will be reduced since said deposited metals has a great influence on the catalyst structure per se at a regeneration temperature about 700° C.

A first aspect of the invention provides a catalyst regeneration process which improves catalyst selectivity, characterized in that a spent catalyst from a reactor is introduced into a first fluidized bed regenerator and contacted with an oxygen-containing gas stream and optional steam to carry out a coke combustion reaction under the regeneration conditions including a temperature ranging from 550° C. to 750° C., a catalyst average residence time ranging from 0.5 min to 6 mins, and a steam: oxygen-containing gas stream ratio by weight ranging from 0 to 0.1, wherein a mixture of the resultant partially regenerated catalyst and flue gas is introduced into a second fluidized bed regenerator and contacted with steam and an optional oxygen-containing gas stream to carry out a further regeneration reaction under the regeneration conditions including a temperature ranging from 550° C. to 700° C., a catalyst average residence time ranging from 3 mins to 30 mins, and an oxygen-containing gas stream:steam ratio by weight ranging from 0 to 500, and then the regenerated catalyst is introduced into the reactor.

In some embodiments of the first aspect, a flue gas produced from the second fluidized bed regenerator is separated by a cyclone separator, and then introduced into a flue gas energy recovery system.

In some embodiments of the first aspect, in the first fluidized bed regenerator, said catalyst average residence time preferably ranges from 0.6 min to 5 mins, said temperatures preferably ranges from 600° C. to 700° C., said steam: oxygen-containing gas stream ratio by weight preferably ranges from 0.001 to 0.05, and a gas superficial velocity of the first fluidized bed regenerator ranges from 0.5 m/s to 3.0 m/s, preferably from 0.6-1.5 m/s.

In some embodiments of the first aspect, in the second fluidized bed regenerator, said catalyst average residence time preferably ranges from 4 mins to 25 mins, said temperature preferably ranges from 580° C. to 680° C., said oxygen-containing gas stream: steam ratio by weight preferably ranges from 5 to 200, and said second fluidized bed regenerator includes a dense section which has a superficial gas velocity ranging from 0.1 m/s to 0.6 m/s, preferably 0.2-0.5 m/s.

In some embodiments of the first aspect, the regeneration temperature in said second fluidized bed regenerator is lower than that in said first fluidized bed regenerator, and even more preferably the regeneration temperature in said second fluidized bed regenerator is 10° C. to 50° C. lower than that in said first fluidized bed regenerator.

In some embodiments of the first aspect, said regenerated catalyst is divided into two parts, one part of the regenerated catalyst is introduced into the reactor, and the other part of the regenerated catalyst is introduced into the first fluidized bed and mixed together with the spent catalyst to increase the temperature thereof.

A second aspect of the invention provides a catalyst regeneration process which improves the catalyst selectivity, characterized in that a spent catalyst from a reactor is introduced into a fluidized dense bed regenerator and contacted with an oxygen-containing gas stream and steam to carry out a coke combustion reaction under the regeneration conditions including a temperature ranging from 550° C. to 750° C., a catalyst average residence time ranging from 4 mins to 30 mins, and a steam: oxygen-containing gas stream ratio by weight ranging from greater than 0 to 0.2, and then the regenerated catalyst is introduced into the reactor.

In some embodiments of the second aspect, a flue gas is produced from the regenerator and introduced to a flue gas energy recovery system via a cyclone separator.

In some embodiments of the second aspect, said residence time preferably ranges from 5.0 mins to 25 mins, more preferably 6.0 to 20 mins; said temperature preferably ranges from 600° C. to 680° C.; said steam: oxygen-containing gas stream ratio by weight preferably ranges from 0.005 to 0.1; and a gas superficial velocity of the fluidized dense bed regenerator ranges from 0.1 m/s to 1.0 m/s, preferably from 0.2 m/s to 0.7 m/s.

In some embodiments of the first and the second aspects, said oxygen-containing gas stream is one or more selected from air, oxygen, and oxygen-enriched air.

In some embodiments of the first and the second aspects, the position for introducing steam into the regenerator is not limited. For example, for the first aspect, steam is optionally introduced into the first fluidized bed; when steam is introduced into the first fluidized bed, it can be introduced into the bottom or other position (such as a middle position) of the first fluidized bed; steam must be introduced into the second fluidized bed; steam can be introduced into the bottom or other position (such as a middle position) of the second fluidized bed. Similarly, for the second aspect, the position for introducing steam into the regenerator is not limited; steam can be introduced into the bottom or other position (such as a middle position) of the regenerator.

In some embodiments of the first and the second aspects, when regenerator heat oversupplies, a part of heat can be removed by passing a part of the catalyst in the regenerator through an external heat-exchanger or/and internal heat-exchanger, i.e. passing a part of the catalyst in the regenerator through an external heat-exchanger or/and internal heat-exchanger to cool the catalyst, and the cooled catalyst is recycled to the regenerator.

In some embodiments of the first and the second aspects, said catalyst is selected from a carbonaceous catalyst from a catalytic cracking process of inferior hydrocarbon oil. In some embodiments of the first and the second aspects, said catalyst comprises zeolite, inorganic oxide and optional clay, which account for the following percents by the total weight of the catalyst respectively: zeolite 1-50% by weight, inorganic oxide 5-99% by weight, and clay 0-70% by weight. Said zeolite is the active component, which is selected from medium pore size zeolite and/or optional large pore zeolite. Said medium pore size zeolite accounts for 0-100% by the total weight of the zeolite, preferably 20-80% by the total weight of the zeolite. Said large pore size zeolite accounts for 0-100% by the total weight of the zeolite, preferably 20-80% by the total weight of the zeolite. The medium pore size zeolite is selected from ZSM series zeolites and/or ZRP zeolites, or the ZSM and/or ZRP zeolites modified with a nonmetal element such as phosphor and/or transition metal element such as iron, cobalt and nickel. A more detailed description of ZRP zeolites is disclosed in U.S. Pat. No. 5,232,675. The ZSM series zeolite is one or more selected from the group consisting of ZSM-5, ZSM-11, ZSM-12, ZSM-23, ZSM-35, ZSM-38, ZSM-48, and other zeolites with a similar structure. A more detailed description of the ZSM-5 zeolties is disclosed in U.S. Pat. No. 3,702,886. The large pore size zeolite is one or more selected from Y series zeolites, which include: rare-earth Y (REY), rare-earth HY (REHY), and ultrastable Y and high silica Y obtained by various processes.

In some embodiments of the first and the second aspects, an inorganic oxide selected from silica ($SiO_2$) and/or alumina ($Al_2O_3$) is used as a binder.

In some embodiments of the first and the second aspects, one or more clays selected from kaolin, halloysite, montmorillonite, diatomite, halloysite, saponite, rectorite, sepiolite, attapulgite, hydrotalcite, bentonite is(are) used as a matrix (i.e. supporter).

Compared with the current regeneration process, the present invention has one or more important advantages selected from the following:

1. The activity distribution of the regenerated catalyst is more uniform. The regenerated catalyst activity is closer to the equilibrium catalyst activity. Dry gas and coke yields are decreased sharply when hydrocarbons are subjected to a catalytic cracking reaction on the regenerated catalyst.

2. The dry gas and coke yields are decreased sharply due to the fact that a part of the heavy metals which deposit on the regenerated catalyst are buried by the matrix and the remaining heavy metals are passivated during a long time exposure of the catalyst to a lower temperature.

3. The fresh catalyst activity approaches to the equilibrium catalyst activity more quickly.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

As used herein, the term "comprising" means that other steps and ingredients that do not affect the final result can be added. This term encompasses the terms "consisting of" and "consisting essentially of". The term "consisting essentially of" means that the composition or method may include additional ingredients and/or steps, but only if the additional ingredients and/or steps do not materially alter the basic and novel characteristics of the claimed process or method.

The term "method" or "process" refers to manners, means, techniques and procedures for accomplishing a given task including, but not limited to, those manners, means, techniques and procedures either known to, or readily developed from known manners, means, techniques and procedures by practitioners of the chemical and chemical engineering.

As used herein, the singular form "a," "an," and "the" include plural references unless the context clearly dictates otherwise. For example, the term "a compound" or "at least one compound" may include a plurality of compounds, including mixtures thereof.

Throughout this disclosure, various aspects of this invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "between" a first indicate number and a second indicate number and "ranging/ranges from" a first indicate number "to" a second indicate number are used herein interchangeably and are meant to include the first and second indicated numbers and all the fractional and integral numerals therebetween.

As used herein, the term "about" refers to ±10%.

BRIEF DESCRIPTION OF THE DRAWINGS

The present invention is herein described, by way of example only, with reference to the accompanying drawings. With specific reference now to the drawings in detail, it is stressed that the particulars shown are by way of example and for purposes of illustrative description of the preferred embodiments of the present invention only, and are presented in the cause of providing what is believed to be the most useful and readily understood description of the principles and conceptual aspects of the present invention. In this regard, no attempt is made to show structural details of the present invention in more detail than is necessary for a fundamental understanding of the invention, the description taken with the drawings making apparent to those skilled in the art how the several forms of the invention may be embodied in practice. In the FIG. 1 and FIG. 2 are the schematic representations of two embodiments of the inventive process.

DETAILED DESCRIPTION OF THE EMBODIMENTS

Various embodiments of the invention have been described. The descriptions are intended to be illustrative, not limitative. Thus, it will be apparent to one skilled in the art that certain modifications may be made to the invention as described without departing from the scope of the claims set out below.

Figure 1:
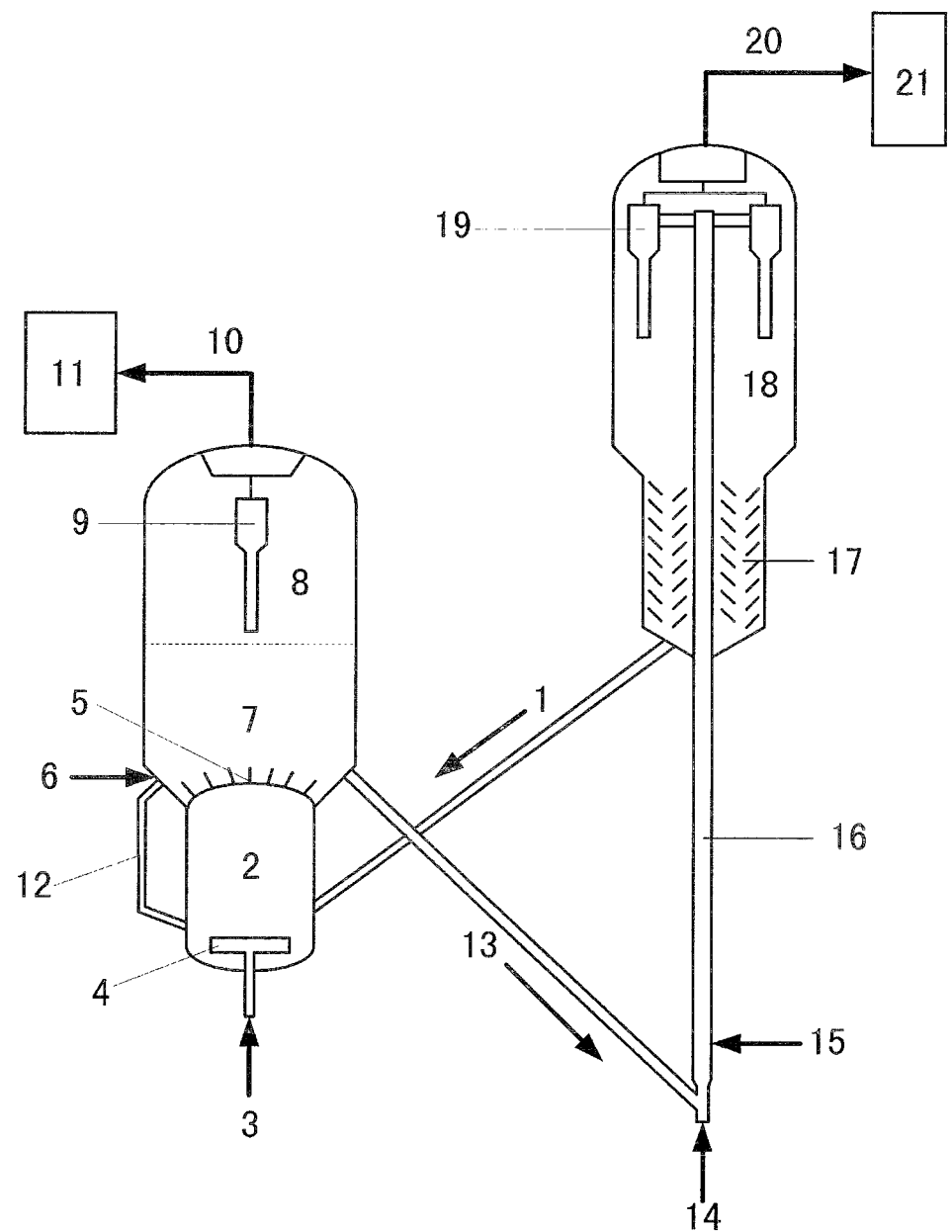

The first embodiment:

The first specific embodiment of the present invention provides an improved catalyst selectivity regeneration process, which can be carried out according to the scheme shown in FIG. 1.

According to the FIG. 1, a spent catalyst from a reactor is introduced into a first fluidized bed regenerator 2 via a spent catalyst standpipe 12. An oxygen-containing gas stream and optional steam from pipe 3 are introduced into the bottom of the first fluidized bed regenerator 2 through an air distributor 4 and contacted with the spent catalyst to carry out a coke combustion reaction. The partially regenerated catalyst and flue gas are introduced into the bottom of a second fluidized bed regenerator 7 via a second distributor 5. Steam and an optional oxygen-containing gas stream are introduced into the bottom of the second fluidized bed regenerator 7 via pipe 6. The partially regenerated catalyst is regenerated fully in the second fluidized bed regenerator 7. The resultant flue gas is introduced into a flue gas energy recovery system 11 via a dilute section 8 of the regenerator, cyclone separator 9 and flue gas pipe 10 in sequence. A part of the regenerated catalyst from the second fluidized bed regenerator 7 is introduced into the bottom of the first fluidized bed regenerator 2 via cycle standpipe 12 and mixed together with the spent catalyst. The other regenerated catalyst from the second fluidized bed regenerator 7 are reintroduced into the bottom of a riser reactor 16 via regeneration standpipe 13. A prelift medium is introduced into the bottom of the riser reactor 16 via pipe 14 and lifts the regenerated catalyst to move upward. Feedstock oil is introduced into riser reactor 16 via pipe 15 and contacted with the regenerated catalyst to carry out a catalytic cracking reaction. Product vapors are introduced into a separator system 21 via disengage 18, cyclone separator 19 and product vapor pipe 20 in sequence to obtain desired products. The spent catalyst is recycled into the first fluidized bed regenerator 2 for the next regeneration cycle via disengage 18, stripper 17 and spent catalyst standpipe 1 in sequence.

Figure 2:
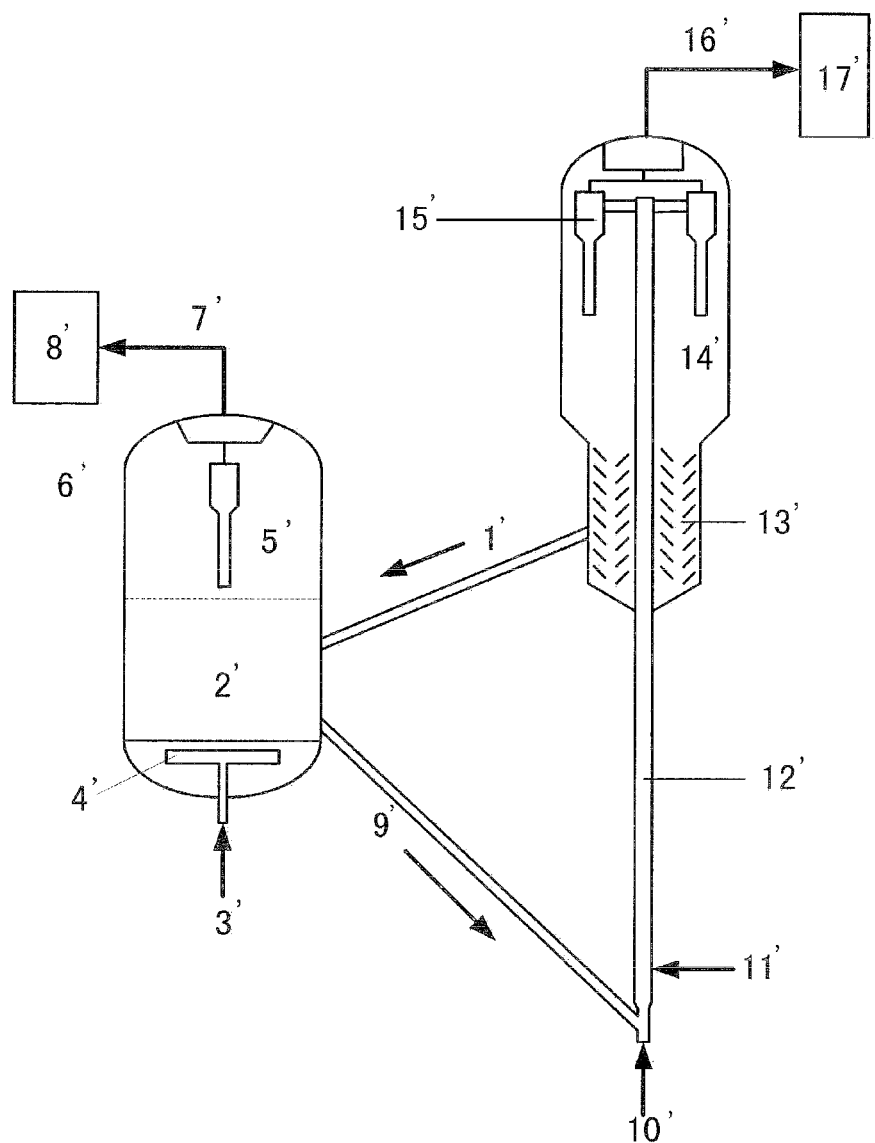

The second embodiment:

The second specific embodiment of the present invention provides an improved catalyst selectivity regeneration process, which can be carried out according to the scheme shown in FIG. 2.

According to the FIG. 2, a spent catalyst from a reactor is introduced into a fluidized dense bed regenerator 2' via a spent catalyst standpipe 1'. An oxygen-containing gas stream and steam from pipe 3' are introduced into the bottom of the fluidized dense bed regenerator 2' through an air distributor 4' and contacted with the spent catalyst to carry out a coke combustion reaction. The resultant flue gas is introduced into a flue gas energy recovery system 8' via a dilute section 5' of the regenerator, cyclone separator 6' and flue gas pipe 7' in sequence. The regenerated catalyst is introduced into the bottom of a riser reactor 12' via regeneration standpipe 9'. A prelift medium is introduced into the bottom of the riser reactor via pipe 10' and lifts the regenerated catalyst to move upward. Feedstock oil is introduced into the riser reactor via pipe 11' and contacted with the regenerated catalyst to carry out a catalytic cracking reaction. Product vapors are introduced into a separator system 17' via a disengage 14', cyclone separator 15' and product vapor pipe 16' in sequence to obtain desired products. The spent catalyst is recycled into the fluidized dense bed regenerator 2' for the next regeneration cycle via a disengage 14', stripper 13' and spent catalyst standpipe 1'.

The following examples are used to demonstrate the effect of the present invention and are not meant to limit the scope of the invention to the detailed examples shown herein. The properties of the feedstock oil used in following examples and comparative examples are listed in table 1. Catalyst (commodity number is MLC-500) used in following examples and comparative examples is produced by Qilu catalyst factory of SINOPEC Catalyst Company, which properties are listed in table 2.

EXAMPLE 1

As shown in the FIG. 1, the present example was carried out in a pilot catalytic cracking plant. The catalyst was regenerated according to the regeneration process of the present invention. Catalyst properties were listed in table 2. The oxygen-containing gas stream was air. Regeneration conditions in the first fluidized bed comprised a gas superficial velocity of 1.0 m/s, a steam: oxygen-containing gas stream ratio by weight of 0.01, a catalyst average residence time of 1.5 min, and a regeneration temperature of 680° C. Regeneration conditions in the second fluidized bed comprised a gas superficial velocity of 0.3 m/s, an oxygen-containing gas stream:steam ratio by weight of 50, a catalyst average residence time of 10 min, and a regeneration temperature of 650° C. The nickel content of the regenerated catalyst was about 10000 μg/g. The regenerated catalyst was introduced into the reactor and contacted with the feedstock oil which was shown in table 1 to carry out a catalytic cracking reaction. The regeneration conditions, reaction conditions, regeneration results and reaction results were listed in table 3.

COMPARATIVE EXAMPLE 1-1

The comparative example was carried out in the same pilot plant as in Example 1. The same spent catalyst as in example 1 was regenerated according to a conventional regeneration process. Regeneration conditions in the first fluidized bed comprised a gas superficial velocity of 1.2 m/s, a catalyst average residence time of 1.0 min, and a regeneration temperature of 700° C. Regeneration conditions of the second fluidized bed comprised a gas superficial velocity of 1.2 m/s, a catalyst average residence time of 2.0 min, and a regeneration temperature of 720° C. The nickel content of the regenerated catalyst was about 10000 μg/g. The regenerated catalyst was introduced into the reactor and contacted with the feedstock oil which was shown in table 1 to carry out a catalytic cracking reaction. The regeneration conditions, reaction conditions, regeneration results and reaction results were listed in table 3.

COMPARATIVE EXAMPLE 1-2

The comparative example 1-2 was conducted in the same pilot plant as that in Example 1, and the same spent catalyst and process conditions as those in Example 1 were employed, with the exception that no steam was introduced into the first and second fluidized bed regenerators. The regeneration results and reaction results were listed in table 3.

It can be seen from table 3, the dry gas and coke yields according to the inventive example 1 were decreased sharply, and the dry gas and coke selectivities of the regenerated catalyst obtained in the present invention were improved obviously when compared with comparative examples 1-1 and 1-2.

EXAMPLE 2

As shown in the FIG. 2, the present example was carried out in a pilot catalytic cracking plant. The catalyst was regenerated according to the regeneration process of the present invention. Catalyst properties were listed in table 2. The oxygen-containing gas stream was air. Regeneration conditions of the regenerator comprised a gas superficial velocity of 0.3 m/s, a catalyst average residence time of 10 min, a regeneration temperature of 650° C., and steam: oxygen-containing gas stream ratio by weight of 0.02. The nickel content of regenerated catalyst was about 10000 μg/g. The regenerated catalyst was introduced into the reactor and contacted with feedstock oil which was shown in table 1 to carry out a catalytic cracking reaction. The regeneration conditions, reaction conditions, regeneration results and reaction results were listed in table 4.

COMPARATIVE EXAMPLE 2-1

The comparative example was carried out in the same pilot plant as in Example 2. The same spent catalyst as in example 2 was regenerated according to a conventional regeneration process. The regeneration conditions of the regenerator comprised a gas superficial velocity of 0.6 m/s, a catalyst average residence time of 3 min, and a regeneration temperature of 700° C. The nickel content of the regenerated catalyst was about 10000 ng/g. The regenerated catalyst was introduced into the reactor and contacted with feedstock oil which was shown in table 1 to carry out a catalytic cracking reaction. The regeneration conditions, reaction conditions, regeneration results and reaction results were listed in table 4.

COMPARATIVE EXAMPLE 2-2

The comparative example 2-2 was conducted in the same pilot plant as that in Example 2, and the same spent catalyst and process conditions as those in Example 2 were employed, with the exception that no steam was introduced into the regenerator. The regeneration results and reaction results were listed in table 4.

It can be seen from table 4, the dry gas and coke yields according to the present invention process were decreased sharply, and the dry gas and coke selectivities of the catalyst obtained in the present invention were improved obviously when compared with the comparative examples.

TABLE 1

| Type of feedstock oil | Vacuum residue |
|---|---|
| Density (20° C.), g/cm$^3$ | 920.9 |
| Kinematic viscosity, mm$^2$/s | |
| 80° C. | / |
| 100° C. | 114.4 |
| Carbon residue, wt % | 8.2 |

TABLE 1-continued

| Type of feedstock oil | Vacuum residue |
|---|---|
| Freezing point, ° C. | 25 |
| Acid number, mgKOH/g | / |
| Total nitrogen content, wt % | 0.33 |
| Sulfur, wt % | 0.21 |
| C, wt % | 86.91 |
| H, wt % | 12.55 |
| Metal content, ppm | |
| Ni | 8.8 |
| V | 0.1 |
| Fe | 1.8 |
| Cu | <0.1 |
| Na | 3.0 |
| Ca | |
| Boiling range, ° C. | |
| IBP(Initial Boiling Point) | 415 |
| 10% | 545 |
| 30% | / |

TABLE 2

| Commodity number | MLC-500 |
|---|---|
| Chemical composition, wt % | |
| Aluminum oxide | 50.2 |
| Sodium oxide | 0.321 |
| Iron oxide | / |
| Apparent density, kg/m$^3$ | 700 |
| Pore volume, mL/g | 0.38 |
| Specific surface area, m$^2$/g | 229 |
| Attrition index, wt % · h$^{-1}$ | 1.9 |
| Particle size distribution, wt % | |
| 0-40 μm | 17.3 |
| 40-80 μm | 49.3 |
| >80 μm | 33.4 |

TABLE 3

| | Example 1 | Comparative example 1-1 | Comparative example 1-2 |
|---|---|---|---|
| Regeneration unit | | | |
| First fluidized bed regenerator | | | |
| Superficial gas velocity, m/s | 1.0 | 1.2 | 1.0 |
| Catalyst average residence time, min | 1.5 | 1.0 | 1.5 |
| Regeneration temperature, ° C. | 680 | 700 | 680 |
| Steam:oxygen-containing gas stream ratio, wt/wt | 0.01 | / | 0.01 |
| Second fluidized bed regenerator | | | |
| Superficial gas velocity, m/s | 0.3 | 1.2 | 0.3 |
| Catalyst residence time, min | 10 | 2.0 | 10 |
| Regeneration temperature, ° C. | 650 | 720 | 650 |
| Oxygen-containing gas stream: steam ratio, wt/wt | 50 | / | / |
| Coke content of regenerated catalyst, wt % | 0.17 | 0.05 | 0.10 |
| Nickel content of regenerated catalyst, μg/g | 10000 | 10000 | 10000 |
| Hydrocarbon cracking unit | | | |
| Riser outlet temperature, ° C. | 500 | 510 | 500 |
| Catalyst/Feedstock oil ratio, wt/wt | 6 | 4 | 6 |
| Reaction time, s | 3 | 3 | 3 |
| Steam/Feedstock ratio, wt/wt | 0.05 | 0.05 | 0.05 |

TABLE 3-continued

|  | Example 1 | Comparative example 1-1 | Comparative example 1-2 |
|---|---|---|---|
| Product distribution, wt % | | | |
| Dry gas | 2.60 | 3.21 | 3.23 |
| LPG(Liquefied Petroleum Gas) | 12.70 | 13.10 | 13.21 |
| Gasoline | 45.22 | 43.30 | 44.13 |
| Diesel | 21.70 | 20.78 | 20.21 |
| Slurry | 9.18 | 9.86 | 8.51 |
| Coke | 8.60 | 9.75 | 10.71 |
| Total | 100.0 | 100.0 | 100.00 |
| Total light hydrocarbons yield, wt % | 79.62 | 77.18 | 77.55 |
| Octane number | | | |
| RON (Research Octane Number) | 91.8 | 91.2 | 91.3 |
| MON(Motor Octane Number) | 79.6 | 78.6 | 79.1 |

TABLE 4

|  | Example 2 | Comparative example 2-1 | Comparative example 2-2 |
|---|---|---|---|
| Regeneration unit | | | |
| Superficial gas velocity, m/s | 0.3 | 0.6 | 0.3 |
| Catalyst average residence time, min | 10 | 3 | 10 |
| Regeneration temperature, ° C. | 650 | 700 | 650 |
| Steam:oxygen-containing gas stream ratio, wt/wt | 0.02 | / | / |
| Coke content of regenerated catalyst, wt % | 0.20 | 0.08 | 0.07 |
| Nickel content of regenerated catalyst, µg/g | 10000 | 10000 | 10000 |
| Hydrocarbon cracking unit | | | |
| Riser outlet temperature, ° C. | 500 | 510 | 500 |
| Catalyst/Feedstock oil ratio, wt/wt | 6 | 4 | 6 |
| Reaction time, s | 3 | 3 | 3 |
| Steam/Feedstock ratio, wt/wt | 0.05 | 0.05 | 0.05 |
| Product distribution, wt % | | | |
| Dry gas | 2.65 | 3.41 | 3.07 |
| LPG | 12.80 | 13.70 | 13.28 |
| Gasoline | 45.21 | 43.26 | 44.31 |
| Diesel | 21.50 | 20.28 | 20.07 |
| Slurry | 9.14 | 9.50 | 8.65 |
| Coke | 8.70 | 9.85 | 10.62 |
| Total | 100.0 | 100.0 | 100.00 |
| Total light hydrocarbons yield, wt % | 79.51 | 77.24 | 77.66 |
| Octane number | | | |
| RON | 91.6 | 91.0 | 91.3 |
| MON | 79.5 | 78.1 | 78.8 |

It is appreciated that certain aspects and characteristics of the invention, which are, for clarity, described in the context of separate embodiments, may also be provided in combination in a single embodiment. Conversely, various aspects and characteristics of the invention, which are, for brevity, described in the context of a single embodiment, may also be provided separately or in any suitable sub-combination.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

While the invention has been described in conjunction with specific embodiments and examples thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A catalyst regeneration process which improves catalyst selectivity, characterized in that a spent catalyst from a reactor is introduced into a first fluidized bed regenerator and contacted with an oxygen-containing gas stream and optional steam to carry out a coke combustion reaction under the regeneration conditions including a temperature ranging from 550° C. to 750° C., a catalyst average residence time ranging from 0.5 min to 6 mins, and a steam: oxygen-containing gas stream ratio by weight ranging from 0 to 0.1, wherein a mixture of the resultant partially regenerated catalyst and flue gas is introduced into a second fluidized bed regenerator and contacted with steam and an oxygen-containing gas stream to carry out a further regeneration reaction under the regeneration conditions including a temperature ranging from 550° C. to 700° C., a catalyst average residence time ranging from 3 mins to 30 mins, and an oxygen-containing gas stream: steam ratio by weight ranging from greater than 0 to 500, wherein the steam and the oxygen-containing gas stream are introduced into the second fluidized bed separately from the partially regenerated catalyst and the flue gas, and then the regenerated catalyst is introduced into the reactor.

2. The process according to claim 1, characterized in that, in the first fluidized bed regenerator, the regeneration conditions include the catalyst average residence time ranging from 0.6 min to 5 mins, the temperature ranging from 600° C. to 700° C., the steam: oxygen-containing gas stream ratio by weight ranging from 0.001 to 0.05, and a superficial gas velocity of the first fluidized bed regenerator ranging from 0.5 m/s to 3.0 m/s.

3. The process according to claim 1, characterized in that, in the second fluidized bed regenerator, the regeneration conditions include the catalyst average residence time ranging from 4 mins to 25 mins, the temperature ranging from 580° C. to 680° C., and the oxygen-containing gas stream:steam ratio by weight ranging from 5 to 200, and the second fluidized bed regenerator includes a dense section which has a superficial gas velocity ranging from 0.1 m/s to 0.6 m/s.

4. The process according to claim 1, characterized in that said regenerated catalyst is divided into two parts, one part of the regenerated catalyst is introduced into the reactor, and the other part of the regenerated catalyst is introduced into the first fluidized bed and mixed together with the spent catalyst.

5. The process according to claim 1, characterized in that the regeneration temperature in said second fluidized bed regenerator is lower than that in said first fluidized bed regenerator.

6. The process according to claim 1, characterized in that the regeneration temperature in said second fluidized bed regenerator is 10° C. to 50° C. lower than that in said first fluidized bed regenerator.

7. The process according to claim 1, characterized in that a flue gas produced from the second fluidized bed regenerator is separated by a cyclone separator, and then introduced into a flue gas energy recovery system.

8. A catalyst regeneration process which improves catalyst selectivity, characterized in that a spent catalyst from a reactor is introduced into a fluidized dense bed regenerator and contacted with an oxygen-containing gas stream and steam to carry out a coke combustion reaction under the regeneration conditions including a temperature ranging from 550° C. to 750° C., a catalyst average residence time ranging from 4 mins to30 mins, and a steam: oxygen-containing gas stream ratio by weight ranging from greater than 0 to 0.2, wherein the steam is introduced into the fluidized dense bed regenerator separately from the spent catalyst, and then the regenerated catalyst is introduced into the reactor.

9. The process according to claim 8, characterized in that said temperature ranges from 600° C. to 680° C.

10. The process according to claim 8, characterized in that said residence time ranges from 5.0 mins to 25 mins.

11. The process according to claim 8, characterized in that said residence times ranges from 6.0 mins to 20 mins.

12. The process according to claim 8, characterized in that said fluidized dense bed regenerator has a gas superficial velocity ranging from 0.1 m/s to 1.0 m/s.

13. The process according to claim 8, characterized in that said fluidized dense bed regenerator has a gas superficial velocity ranging from 0.2 m/s to 0.7 m/s.

14. The process according to claim 8, characterized in that said steam: oxygen-containing gas stream ratio by weight ranges from 0.005 to 0.1.

15. The process according to claim 8, characterized in that a flue gas is produced from the regenerator and introduced to a flue gas energy recovery system via a cyclone separator.

16. The process according to claim 1 or claim 8, characterized in that said oxygen-containing gas stream is one or more selected from air, oxygen, and oxygen-enriched air.

17. The process according to claim 1 or claim 8, characterized in that a part of the catalyst in the regenerator is heat-exchanged by passing said catalyst through an external heat-exchanger or/and internal heat-exchanger.

18. The process according to claim 1 or claim 8, characterized in that said catalyst comprises zeolite in an amount of 1-50 wt %, an inorganic oxide in an amount of 5-99 wt % and an optional clay in an amount of 0-70 wt %, relative to the total weight of the catalyst.

19. The process according to claim 1 or claim 8, characterized in that said spent catalyst is a carbonaceous catalyst from a catalytic cracking process of an inferior hydrocarbon oil.

* * * * *